United States Patent [19]
Brandon et al.

[11] Patent Number: 6,114,007
[45] Date of Patent: Sep. 5, 2000

[54] FLAME RESISTANT REINFORCED COMPOSITES

[75] Inventors: Ralph Edwin Brandon; James V. Gauchel, both of Newark, Ohio

[73] Assignee: Owens Corning Fiberglas Technology, Inc., Summit, Ill.

[21] Appl. No.: 09/406,053

[22] Filed: Sep. 27, 1999

[51] Int. Cl.⁷ .............................. B32B 3/10; C08F 20/00; C08J 3/04
[52] U.S. Cl. .......................... 428/141; 525/437; 525/445; 524/81; 524/401; 524/442; 524/445; 428/373; 428/375; 428/480; 264/239; 264/257; 264/331.11
[58] Field of Search ..................................... 525/437, 445; 524/81, 401, 442, 445; 428/141, 373, 375, 480; 264/239, 257, 331.11

[56] References Cited

U.S. PATENT DOCUMENTS

| | | |
|---|---|---|
| 5,008,145 | 4/1991 | Kinson et al. . |
| 5,258,232 | 11/1993 | Summers et al. . |
| 5,357,026 | 10/1994 | Younes . |
| 5,635,125 | 6/1997 | Ternes et al. . |

*Primary Examiner*—Samuel A. Acquah
*Attorney, Agent, or Firm*—Inger H. Eckert

[57] ABSTRACT

A fire resistant thermosetting resin composite formulation comprising an effective amount of a flame suppressant additive. The thermosetting resin used in the formulation can be a polyester resin. The flame suppressant additive is a polyvinyl chloride powder which may be obtained as a reaction product of an emulsion polymerization, or alternatively, it may be obtained from recycled products containing significant amounts of polyvinyl chloride. The additive can be used in an amount of from 1% by weight to about 75% by weight based on the amount of an inorganic filler material that may be present in the formulation.

17 Claims, No Drawings

6,114,007

FLAME RESISTANT REINFORCED COMPOSITES

TECHNICAL FIELD AND INDUSTRIAL APPLICABILITY OF THE INVENTION

The invention relates to fire resistant, composite molding applications using a composition containing an effective amount of a flame retardant additive. The flame retardant additive is a powdered polymeric material which does not melt and remains non-reactive during the molding process required to form the composite. Preferably, the powdered, flame-retardant polymer is a polyvinyl chloride powder that may be used alone or in combination with an inorganic filler. Reinforced products made according to the invention, such as composite roofing or construction materials, are rendered fire resistant in that the flame retardant additive, when exposed to temperatures high enough to cause combustion of the composite, decomposes and releases gases which act as flame suppressants. Also disclosed is a method of making suitably fire resistant composites, and articles formed therefrom.

BACKGROUND OF THE INVENTION

Fiber reinforced composite materials are known for use in a variety of applications, including the manufacture of reinforced articles where structural strength is important. Such applications include roofing and construction materials, including artificial shingles or shakes, cables and automobile body parts. The composites used to make such articles may comprise one or more of a variety of polymeric materials as a matrix, molded together with a reinforcing fiber material, typically glass. The composites so formed are often used at high temperatures, or may otherwise be exposed to high heat conditions. Where the composites are used as building materials such as shingles or shakes, flame retardance is desirable as a safety feature. In this regard especially, some degree of resilience of the molded composites to combustion is required. Further, flammability is generally an undesirable characteristic in resin-based composites because combustion of the resin matrix typically results in release of by-products including chemical compounds and gases that are toxic to the environment and pose a safety threat if inhaled.

Accordingly, various means have been recognized in the art for improving fire resistance in molded composites. The term "fire resistance", as used herein, is intended to encompass flame retardance, i.e. the ability of the material to diminish or prevent combustion when the material is exposed to high temperatures, as well as flame suppression, or the ability of the material to extinguish flames by virtue of physico-chemical reactions that occur when it is burned.

One means of improving the fire resistance of molded composites involves coating a molded composite article with a finish that imparts fire resistance. To obtain such a finish, a coating containing the ingredient that imparts fire resistance is applied by spraying, roll coating, brushing or other means onto the surface of the already molded composite product. The obvious disadvantages of this process include the need for additional processing steps in applying and curing the fire resistant layer. Moreover, the finish is susceptible to gradual erosion or other removal over time, and therefore may not provide complete coverage of the molded surface.

An alternative means of imparting fire resistance is by addition of a flame retardant additive to the composite matrix resin before it is cured to form the composite. Adding the flame retardant additive reduces the susceptibility of the matrix resin to combustion. Research involving the development of flame retardant additives has included adding various compounds to particular resin matrices. Such compounds may provide a flame suppressant effect by virtue of physico-chemical reactions during burning. For example, compounds such as melamines or other polymeric compounds may release flame suppressant compounds such as halogenated gases, upon combustion. Further, this type of chemical flame suppressant additive may optionally be combined with a synergist such as, for example, various oxides of antimony and arsenic. Alternatively, an inert, non-reactive, non-combustible flame retardant material may be added as a filler. Such a material may be one that is highly resistant to thermal degradation, and does not burn at temperatures that would cause combustion, or may otherwise provide a cooling effect. One such additive is a finely divided silica which may absorb heat at high temperatures.

While chemical flame retardant additives have been known in the art, it has been recognized that the selection of a particular additive is determined by the resin that is used to form the composite matrix. For example, U.S. Pat. No. 5,357,026 points out that particular flame retardant additives are specific to particular matrix resins. Therefore, significant experimentation is required to identify effective flame retardant additives and amounts thereof that may be used in combination with a particular matrix resin to form a fire resistant composite.

The selection of materials used to make fire resistant composites is also determined by cost. In the manufacture of such composite materials for use in the building industry, in particular, it is desirable that the costs of bulk materials used to make the composite products be maintained as low as possible, since purchasers use large quantities of these materials. Therefore, the flame retardant additive should be cost-effective to use. Availability of a cost-effective matrix resin material is also essential.

Accordingly, there exists in the art a need for a fire resistant composite wherein the desired fire resistance is provided by the addition of a flame retardant additive that can be cost-effectively used with a compatible matrix resin.

SUMMARY OF THE INVENTION

The invention therefore relates to a composition for forming a fire resistant thermoset fibre-reinforced composite, comprising an optional reinforcing fiber material; a matrix resin comprising a thermosetting resin selected from the group consisting of polyester resins, vinyl ester resins and mixtures thereof; and a particulate polyvinyl chloride as a flame suppressant additive. Additionally, the composition may contain one or more filler materials in addition to the reinforcing fiber component.

As used herein, the term "flame suppressant additive" is intended to mean a compound or mixture that may be included in a composite formulation, such that when such a formulation is exposed to extreme heat conditions or is burned, the flame suppressant additive will react to form a substance which prevents or retards oxidative combustion or burning. The term "reinforcing fiber material" is intended to mean one or more reinforcing materials that are commonly known in the art. Such materials include products made of fibers of glass, polymer, natural fibers, or combinations thereof. The term "composite" is intended to include solidified, structurally reinforced compositions that are based on a cured matrix resin.

The invention further comprises a fire resistant composite article utilizing the composition of the present invention.

Still another aspect of the invention includes a process of making fire resistant composites, comprising the steps of:
  a) preparing a matrix resin composition comprising a thermosetting resin selected from the group consisting of polyester resins, vinyl ester resins and mixtures thereof as a matrix resin, and from about 1% to about 40% by weight of a particulate polyvinyl chloride as a flame suppressant additive;
  b) combining the matrix resin composition with a fiber reinforcing material;
  c) molding the resulting mixture; and
  d) curing to form a composite.

These and other attributes of the invention will be clear to those skilled in the art in light of the following description.

DETAILED DESCRIPTION OF THE INVENTION

Surprisingly, it has been found that when resin compositions comprising certain thermosetting resins are combined with an effective amount of a particulate polyvinyl chloride resin as a flame suppressant additive, the polyvinyl chloride is highly effective in providing fire resistance to the composite product that is formed using such resin compositions. The fire resistant resin compositions of the present invention comprise a matrix resin comprising one or more thermosetting resins selected from the group consisting of polyesters and vinyl esters. It is generally required that such resins be compatible with the polyvinyl chloride flame suppressant additive. Any compatible matrix resin may be used alone or in combination with one or more other compatible resins to form a matrix resin composition that may be cured to form the composite.

Preferably, the matrix resin is a thermoset polyester. Examples of suitable polyesters that are compatible with the polyvinyl chloride flame suppressant additive include M55 and most polyester or vinyl ester resins. Flame suppression is achieved by polyvinyl chloride (PVC) decomposition to hydrochloride (HCI), which is a flame suppressant.

The optional fiber reinforcing material may be any fibrous material that is known in the art for providing reinforcement in a thermoset composite matrix. These fibrous materials may include glass, carbon, natural fibers, polymers, other fiberizable materials known in the art, or mixtures thereof. Examples of fibrous carrier materials that can be used either alone or in combination with glass or carbon fibers include thermoplastics, polyaramids such as KEVLAR® and natural fibers. Glass fiber can be from about 6 to about 16 m in diameter and from about "to about 1" in length. The fibrous carrier material may be used in the form of continuous strands, or as chopped, discrete segments. The fiber reinforcing material is typically incorporated into the matrix resin before it is molded or cured to form the composite.

Prior to incorporation into the matrix resin, the fibrous material may optionally be coated with a suitable sizing composition to enhance incorporation of the fibrous material into the resin matrix. The sizing composition may comprise functional agents such as lubricants, coupling agents and film-forming polymers, which enhance the wet out of the fibers in the matrix resin.

The flame suppressant additive of the present invention is a polyvinyl chloride (PVC) in powdered or particulate form. Any desired PVC can be used. A polyvinyl chloride suitable for use in the present invention may be obtained by recycling PVC-containing materials such as windows, siding and other construction materials, and grinding the PVC obtained therefrom into a powder of a desired particle size. In this regard, the invention also provides for cost-effective recycling of waste materials into useful products.

The polyvinyl chloride may be obtained as a reactor product by preparation from its constituents using an emulsion polymerization process. The product so obtained may be milled to produce a free-flowing powder of desired particle size. Any desired particle size can be used so long as desired results are achieved. The particle size is itself not limited to a narrow range by virtue of the process used to manufacture the composite molding formulations of the invention. The PVC powder need not be added via a screen or fibrous mat that limits the particle size. Rather, the particle size of the polyvinyl chloride in the present invention should be sufficient to enable ready release of halogenated gases when the composite is ignited. Further, the particles should not be so large as to create undesirable changes in the surface or other appearance of the molded composite.

The polyvinyl chloride is added in an amount sufficient to provide effective flame suppression and often in an amount to at least partially replace the filler material incorporated into the composite matrix. Typically, the amount of the polyvinyl chloride additive ranges from about 1% by weight to about 40% by weight, for example about 1% to about 5% of the composite matrix. The amount of polyvinyl chloride incorporated into the composite matrix can be about half of the amount of inorganic filler material replaced. Therefore, for example, in a formulation in which the amount of inorganic filler material substituted is desirably 10% by weight, up to about 5% by weight of the particulate polyvinyl chloride may be added.

The polyvinyl chloride appears to achieve its flame suppressant effect because of its ability to liberate chlorine and/or other halogenated gases as it decomposes during combustion. The halogenated gases, when liberated, prevent further oxygenation of the burning composite, and as a result the flames are suppressed. Moreover, it is theorized that the particles of flame retardant additive may also advantageously act as a flexibilizer within the composite matrix. In this regard, it is thought that the particles of polymer may provide a cushioning effect that allows the composite to better absorb impact forces, thereby rendering it more pliable where added resilience is necessary.

Other additives, including fillers, catalysts, colorants, mold release agents and inhibitors may be included in the composite formulations of this invention. For example, an inorganic filler material may be incorporated into the formulation. Fillers known to be useful for creating a filled resin system, such as slate flour, calcium carbonate, silicates, ground rock or clays that do not affect the viscosity of the formulation, may be used. Where the composite is used to make roofing materials, slate flour is preferably used as the filler because it contributes to development of a desirable color in the molded product. The inorganic filler, when used, may be used at any desired amount, for example, at a concentration of from about 20% by weight to about 90% by weight of the composition. Preferably, the amount of filler is from about 40% by weight to about 80% by weight. The PVC powder can be present in an amount of from about 1 to about 75% of the filler.

A catalyst may be incorporated into the composite matrix resin formulation to initiate cure of the thermosetting resin. Any desired catalyst can be used. The catalyst can be selected from the group of peroxide catalysts. Exemplary families of catalysts that may be used with the invention include: diacyl peroxides, for example benzoyl peroxide;

peroxyesters, for example t-butyl-peroxy-2-ethylhexanoate; dialkyl peroxides such as dicumyl peroxide; hydroperoxides such as cumene hydroperoxide; perketals such as 1,1-di-(t-butyl-peroxy)cyclohexane; and peroxydicarbonates such as di(2-ethylhexyl)peroxydicarbonate. Preferred catalysts include t-butyl perbenzoate and dicumyl peroxide. One or more of these catalysts may be prepared as a dilute dispersion comprising about 5 parts catalyst to about 95 parts of a solvent such as acetone. Alternatively, a formulation comprising about 1 part catalyst to about 99 parts solvent may be used.

As a colorant, conventional pigments or coloring additives may be included in the composite formulation, depending on the desired end use application. For example, in composite roofing materials, carbon black may be used as a colorant to darken the product or otherwise develop a color approximating that of traditional wood shingles. The colorant is added in an amount sufficient to achieve the desired color, such amount being readily determined by one having ordinary skill in the art.

The formulations of the present invention find utility in the manufacture of composites for uses in industries including but not limited to roofing, exterior floor and wall tiles, exterior siding, construction or automotive. A preferred use of the composite formulations is in the manufacture of construction materials such as roofing shingles or shakes. The latter articles may take the form of the traditional "double coverage" layered tiles in which a significant portion of the shingle tile is covered or overlapped by the exposed portion of a superimposed tile. The composite formulations of the invention are however also sufficiently lightweight and durable to permit the manufacture of "single coverage" tiles in which only a small area of overlap is required between tiles.

The fire resistant composite molding formulation of the present invention is preferably prepared as a bulk molding compound (BMC). The ingredients including the powdered polyvinyl chloride, the optional reinforcing fiber material and the optional filler component are typically dry-blended in a mixer, and then blended with the liquid resin in a "plow" type mixer. The mixture is then extruded through a die of appropriate dimension, for example through a cylindrical die to form a shaped "log" of bulk molding compound. Because the mixture is formed in an extruder, the particle size of the polyvinyl chloride powder is not critical, and can be determined according to the availability of the raw material.

The composition may then be molded using any one of several molding means known in the art. The formulation can be molded into composites using compression molding, injection-compression molding, and/or injection molding. During compression molding, the BMC log is placed in the mold, then the mold is maintained closed for the time required to achieve cure. The formulation is then removed from the mold and cooled in flat conditions such as cooling racks or on a conveyor through cooling tunnels.

Typically, the compression molding process involves heating the composition to be cured up to a temperature of about 350° F. The composition can be cured between 290° F. and 320° F. This temperature is sufficient to cure the matrix resin, but is lower than the degradation temperature of the polyvinyl chloride flame suppressant. Accordingly, in the composite according to the method of this invention, the polyvinyl chloride should not deteriorate or liberate halogenated gases during setting or cure of the matrix resin. The curing time of the composite formulation may also be affected by the addition of the polyvinyl chloride, which is a thermoplastic polymer. The powder contributes some thermoplastic properties to the formulation, and as a result, the composition demonstrates increased flowability when molded. The cure time required to set the molded mixture may be increased somewhat above the time required to set a thermosetting formulation which does not contain a thermoplastic component.

The following example is representative of the invention, but does not restrict it.

EXAMPLE

Example 1

Preparation of a Flame Retardant Composition

A 40-kilogram batch formulation of a bulk molding compound was prepared using a polyester resin, polyvinyl chloride powder and E-glass fiber, chopped into segments of approximately 4 mm, as the reinforcing fiber material. The formulation contained the following ingredients:

TABLE 1

| Component | Amount (g) | % Weight |
| --- | --- | --- |
| 55-M resin (polyester) | 7900 | 19.75 |
| trig C resin (polyester) | 80 | 0.2 |
| trig 121 | 20 | 0.05 |
| PVC powder | 1520 | 3.8 |
| Calcium stearate | 400 | 1.0 |
| 152A 17C chopped E-glass fiber | 1206 | 3.0 |
| slate flour | 28880 | 72.2 |

The 55-M resin was a polyester resin commercially available from Alpha Owens Corning. Trig-C and Trig 121 were added as peroxide catalysts to activate the resin during the curing phase. Calcium stearate was added to the formulation as a mold release agent.

The mixture was compounded in a batch mixer and extruded to form logs of bulk molding compound of about 3 inches in diameter. The shaped logs were then molded by compression molding to form articles of a desired configuration.

It is believed that Applicants' invention includes many other embodiments which are not herein described, accordingly this disclosure should not be read as being limited to the foregoing examples or preferred embodiments.

What is claimed is:

1. A thermosetting resin composition comprising:
   a) a thermosetting resin selected from the group consisting of polyesters and vinyl esters;
   b) optionally an inorganic filler material; and
   c) a polyvinyl chloride powder in a flame suppressant effective amount.

2. The composition of claim 1, which comprises the inorganic filler and wherein said polyvinyl chloride powder is present in the composition in an amount of from about 1% by weight up to about 75% by weight of the total weight of inorganic filler.

3. The composition of claim 1, wherein the polyvinyl chloride is obtained as a reactor product from an emulsion polymerization process.

4. The composition of claim 1, wherein the polyvinyl chloride powder is obtained by recycling materials comprising polyvinyl chloride.

5. The composition of claim 1, wherein the inorganic filler material is present and is selected from the group consisting of slate flour, calcium carbonate, clay, silicates, and ground rock.

6. The composition of claim 1, further comprising at least one additive selected from the group consisting of catalysts, colorants, and mold release agents.

7. The composition of claim 1, further comprising a reinforcing fiber.

8. A process of making a fire resistant molded composite, comprising:
   a) preparing a composition comprising a polyester matrix resin;
   b) adding an inorganic filler material;
   c) adding polyvinyl chloride powder in a flame suppressant effective amount and,
   d) molding the mixture at a temperature below the decomposition point of the polyvinyl chloride powder to form a composite.

9. A process of claim 8, wherein step (c) comprises adding from about 1% by weight up to about 50% by weight of polyvinyl chloride powder, based on the total weight of inorganic filler.

10. The process of claim 8, further comprising shaping the composite during the molding step into shingles.

11. The process of claim 8, further comprising adding an additive selected from the group consisting of catalysts, colorants, and mold release agents.

12. The process of claim 9, further comprising adding an amount of carbon black sufficient to darken the color to the molded product.

13. A process for increasing the flexibility of a composite roofing material, comprising:
   a) preparing a composition comprising a polyester matrix resin;
   b) adding an inorganic filler material;
   c) adding a flame retardant additive in the form of a polyvinyl chloride powder; said polyvinyl chloride powder being added to the composition in an amount of from about 5% by weight up to about 25% by weight of the total amount of inorganic filler;
   d) molding the mixture at a temperature below the decomposition point of the polyvinyl chloride powder to form a composite roofing material.

14. The process of claim 13, wherein the composite roofing material is a shingle laid in a single coverage layer.

15. The process of claim 13, wherein the composite roofing material is a shingle laid in a double coverage layer.

16. A fire resistant composite material comprising a composition as claimed in claim 1.

17. The composition of claim 1, comprising about 1 to 40% by weight of the particulate polyvinyl chloride.

\* \* \* \* \*